(12) United States Patent
Müller

(10) Patent No.: US 7,273,072 B2
(45) Date of Patent: Sep. 25, 2007

(54) VALVE BODY FOR A VALVE ASSEMBLY

(75) Inventor: Fritz Müller, Ingelfingen (DE)

(73) Assignee: GEMÜ Gebrüder Müller Apparatebau GmbH & Co. KG, Ingelfingen (DE)

( * ) Notice: Subject to any disclaimer, the term of this patent is extended or adjusted under 35 U.S.C. 154(b) by 0 days.

(21) Appl. No.: 11/125,587

(22) Filed: May 10, 2005

(65) Prior Publication Data

US 2005/0252562 A1    Nov. 17, 2005

(30) Foreign Application Priority Data

May 12, 2004  (DE) .................. 20 2004 007 628 U

(51) Int. Cl.
*F10K 11/20* (2006.01)
(52) U.S. Cl. ..................... 137/885; 251/61.1
(58) Field of Classification Search ................ 137/883, 137/885; 251/61.1
See application file for complete search history.

(56) References Cited

U.S. PATENT DOCUMENTS

| | | | |
|---|---|---|---|
| 6,237,637 B1 * | 5/2001 | Kovacs et al. | 137/883 |
| 6,401,756 B1 * | 6/2002 | Crissman et al. | 137/861 |
| 6,672,566 B2 * | 1/2004 | Cordova | 251/331 |

\* cited by examiner

*Primary Examiner*—John Fox
(74) *Attorney, Agent, or Firm*—Henry M. Feiereisen

(57) ABSTRACT

A valve body for a valve assembly includes a main passageway in which a primary valve is received which has a weir constructed to define a valve seat and to interact with a valve element in the form of a diaphragm. Integrated in the valve body is a secondary valve having a weir which defines a valve seat and interacts with a second valve element in the form of a diaphragm. The secondary valve is constructed to allow establishment of a fluid communication upstream of the valve seat of the primary valve between the main passageway and a branch line, via which a medium sample can be extracted and/or steam and/or condensate can be, optionally, released.

8 Claims, 1 Drawing Sheet

Reduced Dead Space < 3 × d

US 7,273,072 B2

VALVE BODY FOR A VALVE ASSEMBLY

CROSS-REFERENCES TO RELATED APPLICATIONS

This application claims the priority of German Patent Application, Serial No. 20 2004 007 628.4, filed May 12, 2004, pursuant to 35 U.S.C. 119(a)-(d).

BACKGROUND OF THE INVENTION

The present invention relates, in general, to a valve assembly, and more particularly to a configuration of a valve body for a valve assembly, especially a diaphragm valve.

Nothing in the following discussion of the state of the art is to be construed as an admission of prior art.

A valve assembly of a type involved here has a valve body with a main passageway in which a primary valve with a weir-type valve seat is fitted to interact with a diaphragm to thereby regulate a flow of medium through the main passageway. In addition, the valve body has a branch line which branches off the main passageway and accommodates a secondary valve with a weir-type valve seat for allowing withdrawal of a sample, and/or release of steam or condensate. The branch line is welded to the valve body, thereby generating a weld seam in the product-conducting zone of the valve assembly. The presence of a weld seam as well the presence of a large dead space between the valve seat of the secondary valve and the valve seat of the primary valve as a consequence of the interposed branch line are disadvantageous. The presence of a dead space is unwanted, especially when a medium in the food industry and pharmaceutical industry is involved because it contributes to contamination of the medium. Moreover, the need for weld seams is difficult to realize on site. In fact, safety concerns dictate that in most cases the presence of a weld seam in the product-conduction zone is undesired.

It would therefore be desirable and advantageous to provide an improved valve body for a valve assembly to obviate prior art shortcomings and to so construct the valve body as to have only a minimal, substantially insignificant dead space, without any need for a weld seam while still allowing a n effective and cost-efficient extraction of a sample and/or release of steam or condensate.

SUMMARY OF THE INVENTION

According to one aspect of the present invention, a valve body for a valve assembly includes a main passageway, a primary valve received in the main passageway and having a weir constructed to define a valve seat for interaction with a first valve element in the form of a diaphragm, a branch line, and a secondary valve having a weir to define a valve seat and constructed to interact with a second valve element in the form of a diaphragm such as to allow establishment of a fluid communication upstream of the valve seat of the primary valve between the main passageway and the branch line.

The present invention resolves prior art problems by constructing the valve body in such a manner that a secondary valve with its weir, including the fluid communication between the main passageway and the branch line is integrated in the valve body. In other words, the branch line branches off directly from the secondary valve that is integrated in the valve body. The presence of such an integrated construction allows implementation of the two weir-type valve seats and their association in a very simple manner so that the dead space between the valves can be minimized to an insignificant level. As a result, the risk of contamination is significantly reduced and the need for weld seams in the product-conducting zone is eliminated as a consequence of the integration and construction of the fluid communication between the main passageway and the branch line directly within the valve body. In addition, the valve body is compact and requires little space, and the secondary valve can be disposed in the valve body at a location that gives an operator easy access to the actuating mechanism for the secondary valve. The operation of the first and/or secondary valve may be realized by hand, pneumatically or electronically.

Moreover, the monolithic design of both valves in a single valve body results in a better quality control for produced products because of the absence of any welded connections.

According to another feature of the present invention, the fluid communication between the main passageway and the branch line via the valve seat of the secondary valve may be constructed as a connection channel which is also arranged in the valve body. This contributes further to a compact construction of the valve body in the absence of any welded connections.

Suitably, the secondary valve is provided for extraction of a sample, and/or release of steam and/or condensate.

According to another feature of the present invention, the valve body may be made in the form of a solid material body, or in the form of a forged body.

A valve body according to the present invention thus has integrated therein two valve seats intended for different purposes and forming part of two diaphragm valves which fluidly communicate with the main passageway via a connection that is also integrated in the valve body.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
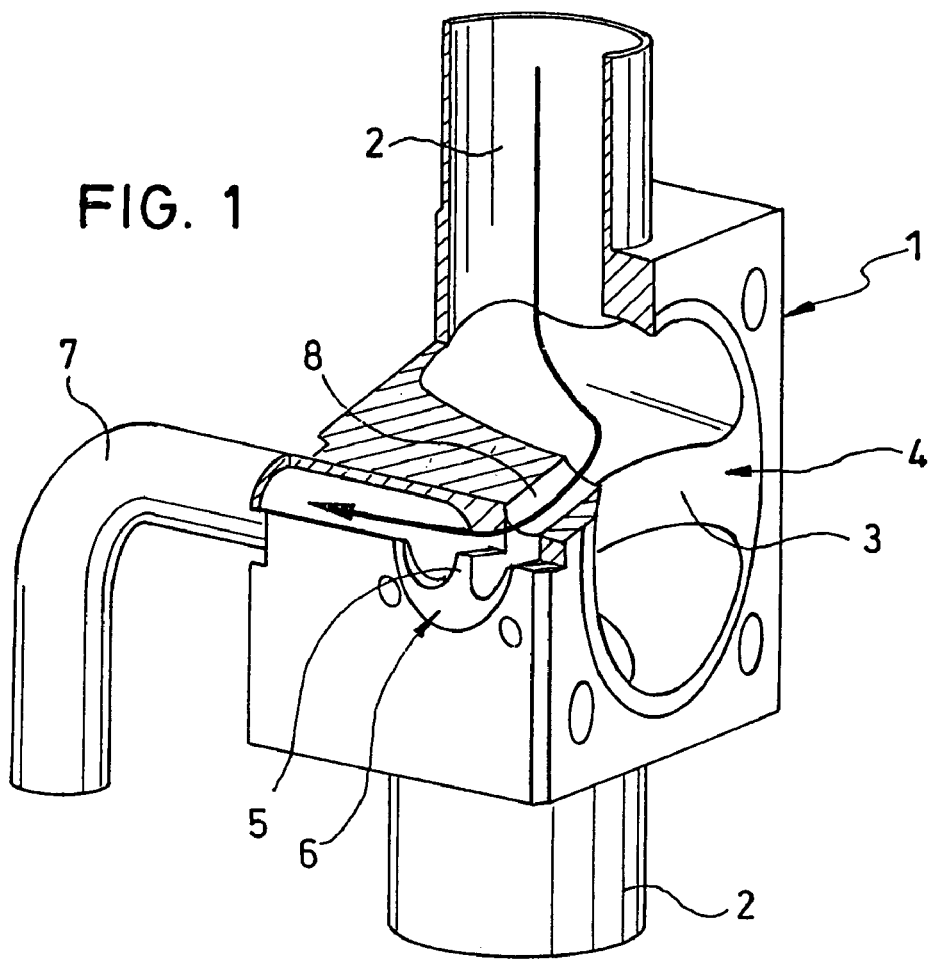
FIG. 1 is a schematic perspective illustration of a valve body according to the present invention for use in a valve assembly.

Throughout all the Figures, same or corresponding elements are generally indicated by same reference numerals. The depicted embodiment is to be understood as illustrative of the invention and not as limiting in any way. It should also be understood that the drawings are not necessarily to scale and that the embodiment is sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic perspective illustration of a valve body according to the present invention, generally designated by reference numeral 1, for installation in a valve assembly which is otherwise not shown in more detail for the sake of simplicity. The valve body 1 has a main passageway 2. Arranged in the area of the main passageway 2 is a first weir-type valve seat 3 which interacts with an unillustrated diaphragm as valve element to define therewith a primary valve, generally designated by reference numeral 4 and constituting the main valve. When the valve 4 is closed, i.e. when the unillustrated diaphragm rests tightly against the valve seat 3, a flow of medium is barred through the main passageway 2. The valve 4 is constructed such that an installation in substantial horizontal disposition in the valve assembly and respective alignment of the valve seat 3 results in a gradient in a range of preferably 2° to 4° to empty out.

Further constructed in the valve body 1 is a second weir-type valve seat 5 which interacts with an unillustrated diaphragm as valve element to define therewith a secondary valve, generally designated by reference numeral 6. A branch line 7 extends from the valve 6. The portion of the main passageway 2 upstream of the valve seat 3 fluidly communicates with the valve 6 via a connection channel 8 which is also integrated in the valve body 1 and directly constructed in the valve body 1. The arrangement of both valves 4, 6 with their valve seats 3, 5 is shown on an enlarged scale in FIG. 2. The arrow indicates in both FIGS. 1 and 2 the flow direction of a medium, when the primary valve 4 is closed and the secondary valve 6 is open. The secondary valve 6 thus assumes the task of an integrated sample extraction valve, and/or integrated steam valve, and/or integrated condensate valve.

Figure 2:
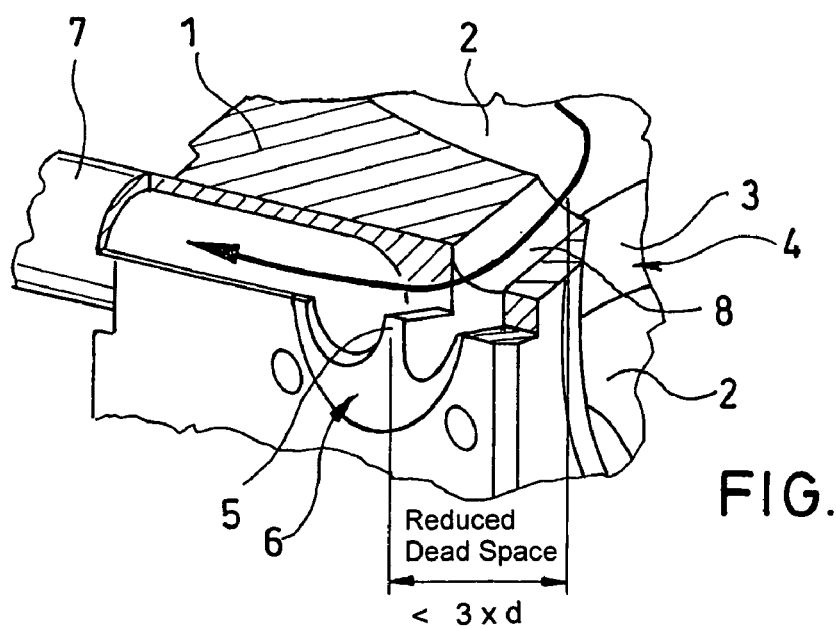
FIG. 2 is a schematic perspective cutaway view, on an enlarged scale, of the valve body, showing in greater detail the association and connection of both valve seats integrated in the valve body.

As shown in FIG. 2, the integrated construction of the valve body 1 results in a small dead space between both valve seats 3, 5 via the connection channel 8 between the main passageway 2 and the secondary valve 6. This dead space is smaller than 3×d, wherein d is the diameter of the connection channel 8, and is advantageous, when media are involved that should be protected against contamination, such as media used in the food industry or pharmaceutical industry.

The valve body 1 may be installed with the main passageway 2 in the valve assembly in substantial vertical relationship, or in substantial horizontal relationship, or at a slight angle of inclination in relation to the vertical and/or horizontal plane. The integration of the connection channel 8 in the valve body 1 eliminates the need for welding in order to provide the fluid communication between the main passageway 2 and the secondary vale 6 so that the operating reliability of the valve body 1 is greatly enhanced.

During normal operation of the valve body 1, the primary valve 4 is open, i.e. the unillustrated diaphragm is detached from the valve seat 3 so that medium is able to flow from top to bottom, as shown in FIG. 1, through the main passageway 2. When a medium sample is to be extracted and/or steam and/or condensate is to be released, the primary valve 4 is closed so that the unillustrated diaphragm rests tightly against the valve seat 3. As a result, the medium is forced to flow from the main passageway 2 via the connection channel 8 to the secondary valve 6. By opening the valve 6 and lifting the respective diaphragm (not shown) from the valve seat 5, the medium is then able to flow from the main passageway 2 via the connection channel 8 to the branch line 7 to allow withdrawal of a medium sample, and/or, if need be, release of steam and/or condensate.

While the invention has been illustrated and described in connection with currently preferred embodiments shown and described in detail, it is not intended to be limited to the details shown since various modifications and structural changes may be made without departing in any way from the spirit of the present invention. For example, some arrangements depend on the installation position as well as size and geometric configuration of the valve seat to be provided. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A valve body for a valve assembly, comprising:
a main passageway;
a primary valve received in the main passageway and having a weir constructed to define a valve seat for interaction with a first valve element in the form of a diaphragm;
a branch line;
a connection channel located upstream of the valve seat of the primary valve and connecting the main passageway to the branch line; and
a secondary valve having a weir to define a valve seat and constructed to interact with a second valve element in the form of a diaphragm for controlling a fluid communication between the main passageway and the branch line via the connection channel, wherein the weir of the primary valve and the weir of the secondary valve extend perpendicular to one another.

2. The valve body of claim 1, made in the form of a solid material body.

3. The valve body of claim 1, made in the form of a forged body.

4. The valve body of claim 1, wherein the secondary valve is constructed to allow extraction of a sample, and/or release of steam and/or condensate via the branch line.

5. The valve body of claim 1, wherein the primary valve has a gradient in a range of 2° to 4°.

6. The valve body of claim 1, wherein the connection channel represents a dead space which is smaller than 3×d, wherein d is the diameter of the connection channel.

7. The valve body of claim 1, wherein the weir of the secondary valve is separated from the weir of the primary valve by the connection channel so as to located at a distance to the main passageway.

8. The valve body of claim 1, wherein the weir of the secondary valve extends in parallel relationship to the main passageway.

* * * * *